(12) United States Patent
Lim et al.

(10) Patent No.: US 10,162,228 B2
(45) Date of Patent: Dec. 25, 2018

(54) LIQUID CRYSTAL DISPLAY DEVICE

(71) Applicant: LG DISPLAY CO., LTD., Seoul (KR)

(72) Inventors: DongHun Lim, Goyang-si (KR); JaeYong You, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 81 days.

(21) Appl. No.: 14/579,904

(22) Filed: Dec. 22, 2014

(65) Prior Publication Data
US 2015/0177579 A1    Jun. 25, 2015

(30) Foreign Application Priority Data
Dec. 23, 2013  (KR) .................... 10-2013-0161796

(51) Int. Cl.
  *G02F 1/1343* (2006.01)
  *G02F 1/1368* (2006.01)
  *G02F 1/1362* (2006.01)

(52) U.S. Cl.
  CPC ...... *G02F 1/134336* (2013.01); *G02F 1/1368* (2013.01); *G02F 1/134363* (2013.01); *G02F 1/136227* (2013.01); *G02F 2001/134372* (2013.01)

(58) Field of Classification Search
  None
  See application file for complete search history.

(56) References Cited

U.S. PATENT DOCUMENTS

| | | | | |
|---|---|---|---|---|
| 5,995,178 A | * | 11/1999 | Fujikawa | G02F 1/1362 349/138 |
| 6,970,221 B1 | * | 11/2005 | Park | G02F 1/136227 349/138 |
| 7,342,633 B2 | * | 3/2008 | Tak | G02F 1/133707 349/129 |
| 7,723,727 B2 | * | 5/2010 | Song | G02F 1/136286 349/142 |
| 7,751,013 B2 | * | 7/2010 | Oke | G02F 1/134363 349/141 |

(Continued)

FOREIGN PATENT DOCUMENTS

CN  102866547 A  1/2013

*Primary Examiner* — Antonio Xavier
(74) *Attorney, Agent, or Firm* — Birch, Stewart, Kolasch & Birch, LLP

(57) ABSTRACT

A liquid crystal display device including first, second, and third data lines extending in a first direction on a substrate, the second data line positioned between the first and third data lines; a plurality of gate lines extending in a second direction on the substrate; at least one pixel unit including a first pixel electrode formed in a first pixel area between the first and third data lines intersecting the gate lines, at one side of a first gate line, and a second pixel electrode formed in a second pixel area between the first and third data lines, at another side of the first gate line; and at least one circuit unit formed between the first pixel area and the second pixel area and including a first transistor in which a first electrode of the first transistor is connected to the first data line and a second electrode of the first transistor is connected to the first pixel electrode, and a second transistor in which a third electrode of the first transistor is connected to the third data line and a fourth electrode of the first transistor is connected to the second pixel electrode.

25 Claims, 9 Drawing Sheets

(56) References Cited

U.S. PATENT DOCUMENTS

| | | | | |
|---|---|---|---|---|
| 8,564,753 B2* | 10/2013 | You | G02F 1/134336 | 349/129 |
| 9,405,160 B2* | 8/2016 | Sawada | G02F 1/136286 | |
| 2001/0033353 A1* | 10/2001 | Shimoshikiryo | G02F 1/133707 | 349/129 |
| 2002/0041354 A1* | 4/2002 | Noh | G02F 1/134363 | 349/141 |
| 2002/0159015 A1* | 10/2002 | Seo | G02F 1/134363 | 349/141 |
| 2004/0114084 A1* | 6/2004 | Kim | G02F 1/134363 | 349/143 |
| 2004/0227890 A1* | 11/2004 | Chung | G02F 1/134363 | 349/141 |
| 2005/0174503 A1* | 8/2005 | Kim | G02F 1/136286 | 349/46 |
| 2006/0169983 A1* | 8/2006 | Sawamizu | G02F 1/136213 | 257/72 |
| 2008/0068549 A1* | 3/2008 | Liao | G02F 1/134363 | 349/141 |
| 2008/0117348 A1* | 5/2008 | Chen | G09G 3/3648 | 349/46 |
| 2009/0109160 A1* | 4/2009 | Chen | G02F 1/134336 | 345/98 |
| 2009/0128727 A1* | 5/2009 | Yata | G02F 1/134363 | 349/46 |
| 2009/0310075 A1* | 12/2009 | Kim | G02F 1/133707 | 349/144 |
| 2010/0123844 A1* | 5/2010 | Um | G02F 1/133707 | 349/39 |
| 2010/0182521 A1* | 7/2010 | Inoue | G02F 1/134336 | 349/33 |
| 2010/0207862 A1* | 8/2010 | Xu | G02F 1/134336 | 345/90 |
| 2012/0033149 A1* | 2/2012 | Song | G02F 1/134363 | 349/42 |
| 2012/0086743 A1* | 4/2012 | Shiomi | G02F 1/136213 | 345/694 |
| 2012/0206658 A1* | 8/2012 | Yoshida | G02F 1/136213 | 348/731 |
| 2012/0268679 A1* | 10/2012 | Song | G02F 1/1362 | 349/42 |
| 2013/0101755 A1* | 4/2013 | Lee | G02F 1/133707 | 428/1.23 |
| 2013/0120703 A1* | 5/2013 | Noda | G02F 1/134309 | 349/144 |
| 2015/0138479 A1* | 5/2015 | Lee | G02F 1/136286 | 349/44 |
| 2015/0219971 A1* | 8/2015 | Tanaka | G02F 1/13338 | 349/12 |

* cited by examiner

LIQUID CRYSTAL DISPLAY DEVICE

CROSS-REFERENCE TO RELATED APPLICATION

This application claims priority from and the benefit under 35 U.S.C. § 119(a) of Korean Patent Application No. 10-2013-0161796, filed on Dec. 23, 2013, which is hereby incorporated by reference for all purposes as if fully set forth herein.

BACKGROUND OF THE INVENTION

1. Field of the Invention

The present invention relates to a liquid crystal display device for displaying an image.

2. Description of the Prior Art

Liquid crystal display devices include two or more transistors and two or more signal lines for supplying signals to pixel electrodes for displaying an image.

Although liquid crystal display devices are becoming thinner, lighter, portable, and have higher-performance and improved operational characteristics, liquid crystal display devices in related art have poor transmittance ratios.

SUMMARY OF THE INVENTION

An aspect of the present invention is to increase a transmittance ratio of a liquid crystal display device.

In particular, an aspect of the present invention is to provide a pixel arrangement technology for increasing a transmittance ratio of a liquid crystal display device.

Another aspect of the present invention is to provide a pixel structure technology for increasing a transmittance ratio of a liquid crystal display device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
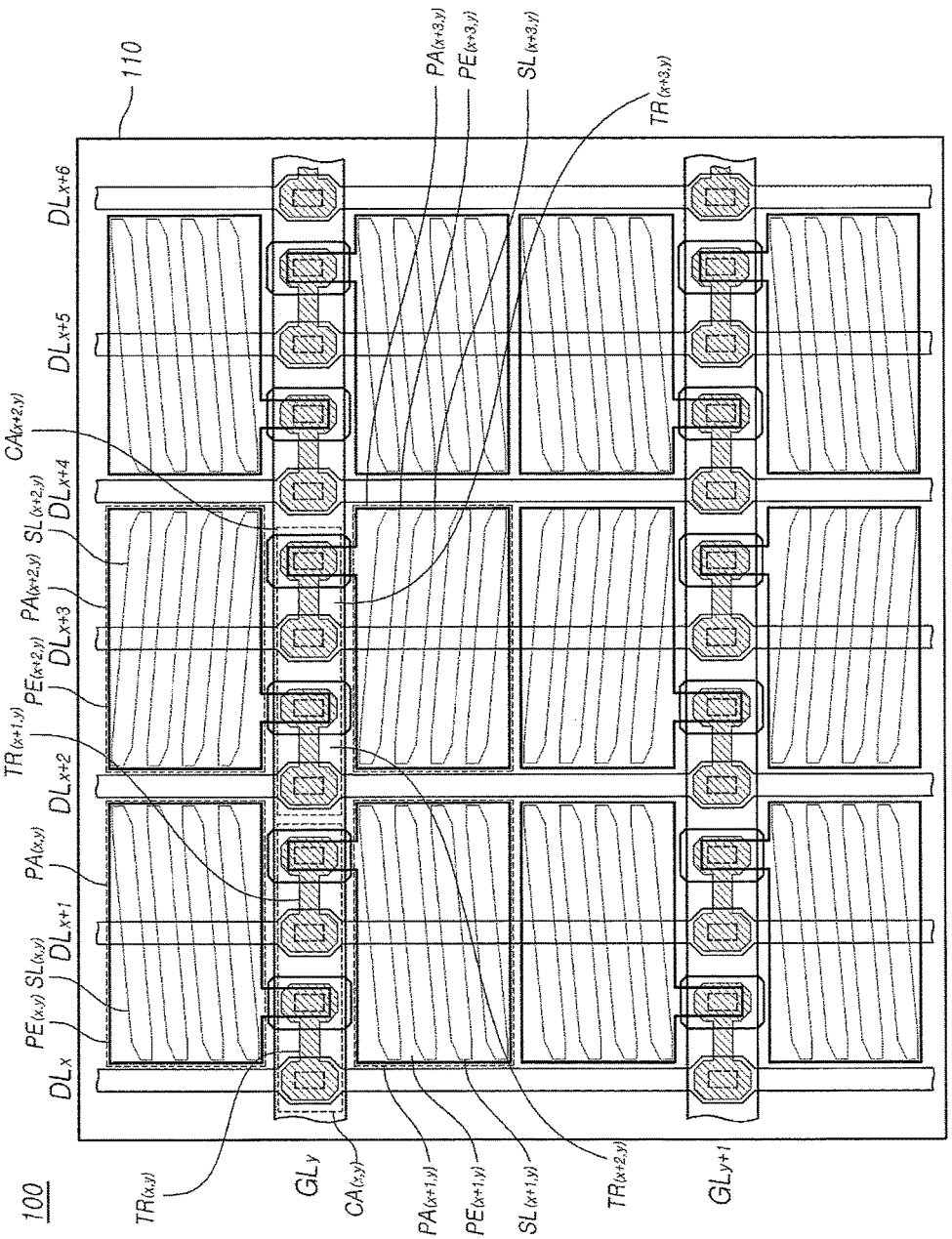
FIG. 1 is a plan view illustrating a part of a liquid crystal display device according to an embodiment of the present invention.

Hereinafter, exemplary embodiments of the present invention will be described with reference to the exemplary drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component. Likewise, when it is described that a certain element is formed "on" or "under" another element, it should be understood that the certain element may be formed either directly or indirectly via a still another element on or under the another element.

FIG. 1 is a plan view illustrating a part of a liquid crystal display device according to an embodiment of the present invention.

Referring to FIG. 1, a liquid crystal display device 100 includes, on a substrate 110, m (m is a natural number larger than 2) data lines DL extending in a first direction to transmit a data signal, and n (n is a natural number larger than 2) gate lines GL extending in the first direction to transmit a gate signal.

The liquid crystal display device 100 includes two pixel areas PA and one circuit area CA formed there between, which are defined at each of intersection points at which one gate line and two data lines cross each other on the substrate 110. Two pixel electrodes PE constituting one pixel unit are formed at each pixel area PA. Two transistors TR constituting one circuit unit are formed in the circuit area CA.

One pixel electrode among the two pixel electrodes PE in each pixel unit and one transistor among the two transistors TR in each circuit unit constitute one pixel P. Further, the other pixel electrode and the other transistor constitute one pixel P.

For example, as illustrated in FIG. 1, in the liquid crystal display device 100, an $(x, y)^{th}$ transistor $TR_{(x, y)}$ is formed in an $(x, y)^{th}$ circuit area $CA_{(x, y)}$ where an $x^{th}$ data line $DL_x$ (x is a natural number larger than 0 and equal to or smaller than n) and a $y^{th}$ gate line $GL_y$ (y is a natural number larger than 0 and equal to or smaller than m) intersect. Meanwhile, an $(x+1, y)^{th}$ transistor $TR_{(x+1, y)}$ is formed in the $(x, y)^{th}$ circuit area $CA_{(x, y)}$ where an $(x+1)^{th}$ data line $DL_{x+1}$ and the $y^{th}$ gate line $DL_y$ intersect. The $(x, y)^{th}$ transistor $TR_{(x, y)}$ and the $(x+1, y)^{th}$ transistor $TR_{(x+1, y)}$ in the $(x, y)^{th}$ circuit area $CA_{(x, y)}$ constitute a $(x, y)^{th}$ circuit unit. Equally, an $(x+2, y)^{th}$ transistor and a $(x+3, y)^{th}$ transistor in an $(x+2, y)^{th}$ circuit area constitute a $(x+2, y)^{th}$ circuit unit. $(1, y)^{th}$, $(3, y)^{th}$, $(5, y)^{th}$, ..., $(m-3, y)^{th}$, and $(m-1, y)^{th}$ circuit units related to the yth gate line may be configured by the same scheme.

Equally, an $(x, y+1)^{th}$ transistor is formed in an $(x, y+1)^{th}$ circuit area where the $x^{th}$ data line and a $(y+1)^{th}$ gate line intersect. Meanwhile, an $(x+1, y+1)^{th}$ transistor is formed in an $(x, y+1)^{th}$ circuit area where an $(x+1)^{th}$ data line and a $(y+1)^{th}$ gate line intersect each other. Equally, an $(x+2, y+1)^{th}$ transistor and an $(x+3, y+1)^{th}$ transistor in an $(x+2, y+1)^{th}$ circuit area $CA_{(x+2, y+1)}$ constitute an $(x+2, y+1)^{th}$ circuit unit. $(1, y+1)^{th}$, $(3, y+1)^{th}$, $(5, y+1)^{th}$ . . . , $(m-3, y+1)^{th}$, and $(m-1, y+1)^{th}$ circuit units related to the $(y+1)^{th}$ gate line may be configured in the same scheme.

Meanwhile, an $(x, y)^{th}$ pixel electrode $PE_{(x, y)}$ connected to one electrode of the $(x, y)^{th}$ transistor $TR_{(x, y)}$ is formed between the $x^{th}$ data line $DL_x$ and an $(x+2)^{th}$ data line $DL_{x+2}$ at an upper portion of a $y^{th}$ gate line $GL_y$. At this time, the $(x, y)^{th}$ pixel electrode $PE_{(x, y)}$ may be formed across the $(x+1)^{th}$ data line $DL_{n+1}$ in an $(x, y)^{th}$ pixel area $PA_{(x, y)}$. The entire shape of the $(x, y)^{th}$ pixel electrode $PE_{(x, y)}$ extends across the $(x+1)^{th}$ data line $DL_{x+1}$ in the first direction. Therefore, although the $(x, y)^{th}$ pixel electrode $PE_{(x, y)}$ has an approximately rectangular shape of which a length of a second direction is longer than the first direction, the $(x, y)^{th}$ pixel electrode $PE_{(x, y)}$ is not limited thereto. Hereinafter, other pixel electrodes may have an approximately rectangular shape of which a length in the second direction is longer than a length in the first direction.

Equally, the $(x+1, y)^{th}$ pixel electrode $PE_{(x+1, y)}$ connected to one electrode of the $(x+1, y)^{th}$ transistor $TR_{(x+1, y)}$ is formed between the $x^{th}$ data line $DL_x$ and the $(x+2)^{th}$ data line $DL_{x+2}$ at a lower portion of the yth gate line $GL_y$. At this time, the $(x+1, y)^{th}$ pixel electrode $PE_{(x+1, y)}$ may be formed across the $(x+1)^{th}$ data line $DL_{x+1}$ in the $(x, y)^{th}$ pixel area $PA_{(x, y)}$.

At this time, the $(x, y)^{th}$ pixel electrode and the $(x+1, y)^{th}$ pixel electrode constitute an $(x, y)^{th}$ pixel unit. Equally, the $(x+2, y)^{th}$ pixel electrode and the $(x+3, y)^{th}$ pixel electrode constitute an $(x+2, y)^{th}$ pixel unit. All of pixel units related to the yth gate line $GL_y$ may be configured in the same scheme.

Equally, an $(x, y+1)^{th}$ pixel electrode connected to one electrode of an $(x, y+1)^{th}$ transistor is formed across an $(x+1)^{th}$ data line $DL_{x+1}$ at an $(x, y+1)^{th}$ pixel area between the $x^{th}$ data line $DL_x$ and the $(x+2)^{th}$ data line $DL_{x+2}$ at an upper portion of a $(y+1)^{th}$ gate late $GL_{y+1}$. Equally, an $(x+1, y+1)^{th}$ pixel electrode connected to one electrode of an $(x+1, y+1)^{th}$ transistor is formed across an $(x+1)^{th}$ data line $DL_{x+1}$ at an $(x, y+1)^{th}$ pixel area between the $x^{th}$ data line DLx and the $(x+2)^{th}$ data line $DL_{x+2}$ at a lower portion of the $(y+1)^{th}$ gate line $GL_{y+1}$. Equally, the $(x+2, y+1)^{th}$ pixel electrode and the $(x+3, y+1)^{th}$ pixel electrode constitute an $(x+2, y+1)^{th}$ pixel unit. All of pixel units related to the $(y+1)^{th}$ gate line $GL_{y+1}$ may be configured in the same scheme.

A common electrode formed by a continuous surface may be formed at an upper portion or a lower portion of each of two pixel electrodes of one pixel unit. For example, a common electrode CE 226 (referring to FIG. 3, discussed below) formed by a continuous surface can be formed at an upper portion or a lower portion of each $(x, y)^{th}$ pixel electrode $PE_{(x, y)}$ of the $(x, y)^{th}$ pixel area $PA_{(x, y)}$ and the $(x+1, y)^{th}$ pixel electrode $PE_{(x+1, y)}$ of the $(x+1, y)^{th}$ pixel area $PA_{(x+1, y)}$ in the $y^{th}$ gate line $GL_y$.

Each of pixel electrodes PE of each pixel unit has one or more slits which is sloped by a predetermined angle. At this time, directions of slits in the pixel electrodes PEs in the two pixel units adjacent to the same gate line may be equal to each other. Meanwhile, the directions of the slits in the pixel electrodes PEs in the two pixel units adjacent to the same gate line GL may be symmetric to the first direction.

Directions of slits in the $(x, y)^{th}$ pixel electrode $PE_{(x, y)}$ of the $(x, y)^{th}$ pixel area $PA_{(x, y)}$ and the $(x+2, y)^{th}$ pixel electrode $PE_{(x+2, y)}$ of the $(x+2, y)^{th}$ pixel area $PA_{(x+2, y)}$ in the $y^{th}$ gate line $GL_y$ are sloped to be symmetric to the first direction. Thus, the symmetric slits in the $(x, y)^{th}$ pixel electrode $PE_{(x, y)}$ and the $(x+2, y)^{th}$ pixel electrode $PE_{(x+2, y)}$ constitute a 2-domain. Accordingly, a symmetric characteristic of a viewing angle of the liquid crystal display device 100 can be improved.

The liquid crystal display device 100 includes a color filter substrate in which a color filter is formed in accordance with a pixel area and a black matrix is formed in accordance with a circuit area. Further, in the liquid crystal display device 100 according to an embodiment, liquid crystal is injected between the substrate 110 in which the pixel area and the circuit area are defined and the color filter substrate in which the color filter and the black matrix are formed. In the liquid crystal display device 100 according to an embodiment, to maintain the pixel areas, the substrate 110 in which the circuit areas are defined, and a cell gap of the color filter substrate in which the color filter and the black matrix are formed, a cell space may be formed in the circuit areas and may be also formed in areas other than the circuit areas.

Figure 2:
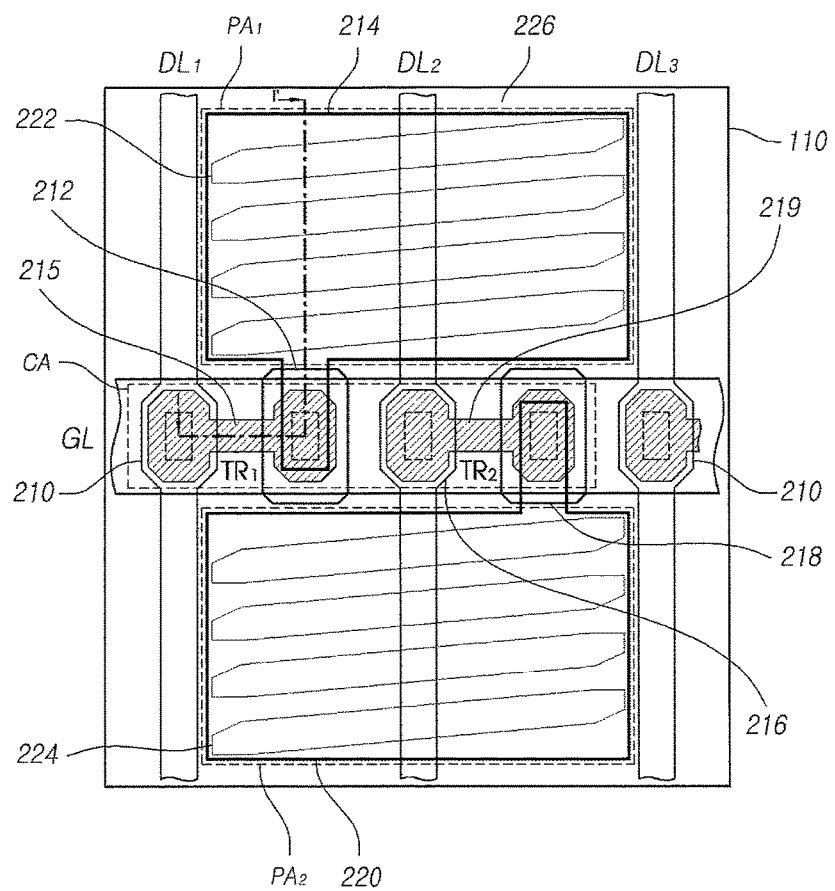
FIG. 2 is a partially enlarged view illustrating an area A of FIG. 1.

Next, FIG. 2 is a partially enlarged view illustrating one pixel unit and one circuit unit of FIG. 1. A circuit unit is formed at a circuit area CA between a first pixel area $PA_1$ and a second pixel area $PA_2$. The circuit unit includes two transistors $TR_1$ and $TR_2$ formed in the circuit area CA.

In the first transistor $TR_1$, a first electrode 210 is connected to a first data line $DL_1$, and a second electrode 212 is connected to a first pixel electrode 214. The first electrode 210 and the second electrode 212 of the first transistor $TR_1$ are connected to a semiconductor layer 215.

In the second transistor $TR_2$, a third electrode 216 is connected to a second data line $DL_2$, and a fourth electrode 218 is connected to a second pixel electrode 220. The third electrode 216 and the fourth electrode 218 of the second transistor $TR_2$ are connected to a semiconductor layer 219.

The pixel unit includes a first pixel electrode 214 formed in the first pixel area $PA_1$ defined by one side of the gate line GL by first and third data lines $DL_1$ and [[$DL_2$]] $DL_3$ intersecting the gate lines GLs, and a second pixel electrode 220 formed in the second pixel area $PA_2$ defined by the other side of the gate line GL.

At this time, the first pixel area $PA_1$ and the second pixel area $PA_2$ are defined across the second data line $DL_2$. Further, the first pixel electrode 214 and the second pixel electrode 220 are defined across the second data line $DL_2$. The entire shape of each of the first pixel electrode 214 and the second pixel electrode 220 correspond to an approximately rectangular shape of which a length of the second direction is longer than a length of the first direction. Although the first pixel electrode 214 and the second pixel electrode 220 may be formed of a metallic oxide or a transparent conductive material such as $TiO_2$, ITO and IZO, the present invention is not limited thereto, and the first pixel electrode 214 and the second pixel electrode 220 may be formed of Cu, Al, Ti, Mo or an alloy of them.

One or more slits 222 and 224 which are sloped by a predetermined angle are formed in the first pixel electrode 214 and the second pixel electrode 220. A direction of the slits 222 of the first pixel electrode 214 and a direction of the slits 224 of the second pixel electrode 220 may be equal to each other. But the direction of the slits 222 and the direction of the slits 224 may be unequal to each other. In other words, a direction of the slits 222 of the first pixel electrode 214 and a direction of the slits 224 of the second pixel electrode 220 are sloped by a predetermined angle in the same direction. Meanwhile, a direction of the slits 222 of the first pixel electrode 214 and a direction of the slits 224 of the second pixel electrode 220 may be sloped by a predetermined angle to be symmetric to the first direction.

Meanwhile, a common electrode 226 formed by a continuous surface is formed at a lower portion of a layer of the first pixel electrode 214 and the second pixel electrode 220. At this time, the common electrode 226 may be formed at an upper portion of the first pixel electrode 214 and the second pixel electrode 220. Although the common electrode 226 may be formed of a metallic oxide or a transparent conductive material such as $TiO_2$, ITO and IZO, the present invention is not limited thereto, and the common electrode 226 may be formed of Cu, Al, Ti, Mo or an alloy of them.

Although it has been described in the aforementioned example that the first pixel electrode 214 and the second pixel electrode 220 include one or more slits 222 and 224 which are sloped by a predetermined angle in the same direction or in a symmetric direction, and the common electrode 226 formed by the continuous surface is formed at an upper portion or a lower portion of the first pixel electrode 214 and the second pixel electrode 220, the present invention is not limited thereto. The common electrode 226 may include one or more slits sloped by a predetermined angle in the same direction or in a symmetric direction, the first pixel electrode is formed at the first pixel formed by the continuous surface at an upper portion or a lower portion of the common electrode 226, and the second pixel electrode is formed at the second pixel area formed by the continuous surface at the upper portion or the lower portion of the common electrode 226.

Figure 3:
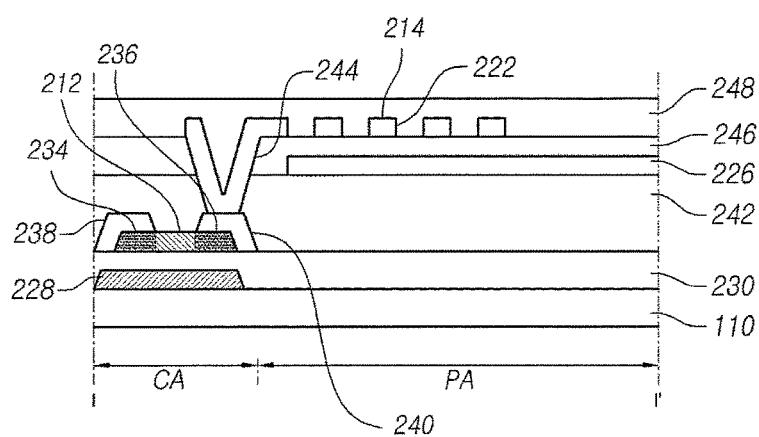
FIG. 3 is a sectional view illustrating an example taken along line I-I' of FIG. 2.

Next, FIG. 3 is a sectional view illustrating an example taken along line I-I' of FIG. 2. A gate electrode 228 is formed in the circuit area CA on the substrate 110. A gate line GL is formed in a second direction integrally with the gate electrode 228. A gate pad is formed at an end of the gate line GL.

An insulation layer, for example, a gate insulation layer 230 is formed on the substrate 110 where the gate electrode 228 and the gate line GL are formed.

A semiconductor layer 215 is formed in the circuit area CA on the substrate 110 where the gate insulation layer 230 is formed. Although the semiconductor layer 215 may be formed by an oxide semiconductor, the present invention is not limited thereto, and the semiconductor layer 215 may be formed of one of poly-silicon, pure amorphous silicon, and impure amorphous silicon. When the semiconductor layer 215 is formed of an oxide semiconductor, a source area 234 and a drain area 236 may be formed by making the oxide semiconductor a conductor (by improving a conductivity of the oxide semiconductor) in an inert gas atmosphere. When the semiconductor layer 215 is formed of an oxide semiconductor, an electric charge mobility of the semiconductor layer 215 is high, so that the semiconductor layer 215 is formed to have a small size. Accordingly, the circuit area CA is reduced and the pixel area PA is enlarged, so that an aperture ratio may increase.

A source electrode 238 is formed in the circuit area CA on the source area 234 of the semiconductor layer 215 of the substrate 110 where the semiconductor layer 215 is formed, and a drain electrode 240 is formed in the drain area 236 of the semiconductor layer 215. At this time, the data line DL is formed in the first direction, and the data line DL and the source electrode 238 are integrally formed.

Another insulation layer, for example, an inter-layer insulation layer 242 is formed on the data line DL and the source/drain electrodes 238 and 240. A contact hole 244, by which the pixel electrode 214 is subsequently connected to the drain area 236 of the semiconductor layer 215, is formed in the inter-layer insulation layer 242.

The common electrode 226 formed by the continuous surface is formed on the inter-layer insulation layer 242 and under a layer of the pixel electrodes 214. The common electrode 226 is connected to a common electrode of an adjacent pixel unit through a common line or a connection pattern. Although the common electrode 226 is formed by the continuous surface, the common electrode 226 may include one or more slits formed between the slits of the pixel electrode 214.

Another insulation layer, for example, a protection layer 246 is formed on the common electrode 226 and a common line CL. In the protection layer 246, the contact hole 244, by which the pixel electrode 214 is subsequently connected to the drain area 236 of the semiconductor layer 215, extends from the inter-layer insulation layer 242.

The pixel electrode 214, in which two or more slits 222 sloped by a predetermined angle are formed in the pixel area PA, is formed on the protection layer 246. The pixel electrode 214 is connected to the drain electrode 240 of the semiconductor layer 215 through the contact hole 244 formed in the inter-layer insulation layer 242 and the protection layer 246. A voltage is applied to each of the pixel electrode 214 having two or more slits 222 and the common electrode 226 formed by the surface, so that an electric field can be formed.

An alignment layer 248 aligned in the second direction by rubbing or optical alignment (for example, ultraviolet irradiation) is formed on the substrate 110.

As illustrated in FIGS. 1 to 3, the pixel electrode 214 is formed to have a rectangular shape of which a length in the second direction is longer than a length in the first direction, and the slit is applied in the second direction (for example, a horizontal direction of FIG. 1), so that a rubbing direction of the alignment layer 248 can progress in the second direction. Thus, although a cell space is formed in the pixel unit, when the alignment layer passes the cell space when being rubbed, a rubbing shadow area, that is, a rubbing tail is necessarily generated in the second direction, that is, toward the circuit area.

As a result, by using an oxide semiconductor having a high mobility, such as a semiconductor layer, a transistor is designed to be smaller than amorphous silicon, and a cell space and a rubbing tail are located between the pixel areas. Therefore, a width of a black matrix formed on a color filter substrate is minimized, and a transmittance ratio of the liquid crystal display device can be improved.

Further, in the aforementioned embodiment, the pixel electrodes 214 are formed to have a rectangular shape of which a length of the first direction is longer than a length of the second direction, the slits 222 of the pixel electrodes 214 are formed in one straight line, and the slits of the two adjacent pixel electrodes are disposed symmetrically to each other. Thus, multiple domains may be formed. Because the slits of the two adjacent pixel electrodes are disposed symmetrically to each other, liquid crystal disclination is prevented. In addition, the multiple dimensions are formed and the transmittance ratio can also be improved.

Figure 4:
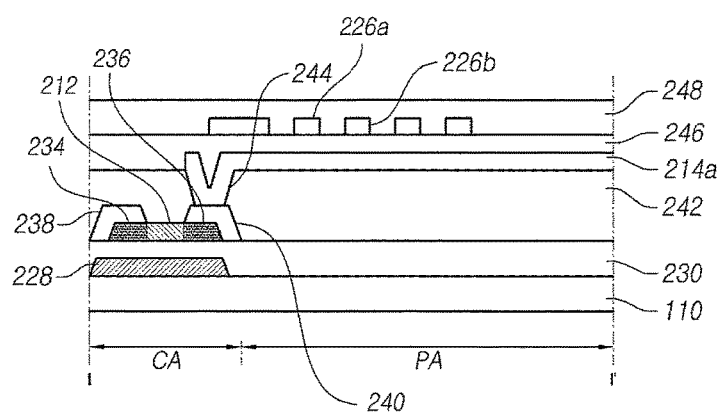
FIG. 4 is a sectional view illustrating another modified example of a pixel electrode and a common electrode of FIG. 3.

Next, in FIG. 4, the gate electrode 228, the semiconductor layer 215, the data line DL, and the source/drain electrodes 238 and 240 are formed in the circuit area on the substrate 110, which is the same as that of FIG. 3.

An inter-layer insulation layer 242 is formed on the data line DL and the source/drain electrodes 238 and 240. The contact hole 244 is formed in the inter-layer insulation layer 242.

A pixel electrode 214a is formed on the inter-layer insulation layer 242. The pixel electrode 214a is connected to the drain electrode 240 through the contact hole 244 formed in the inter-layer insulation layer 242. The pixel electrode 214a is formed by a surface and the common electrode 226a may include one or more slits formed between the slits 226b of the common electrode 226a.

The protection layer 246 is formed on the pixel electrode 214a.

The common electrode 226a, in which two or more slits 226b sloped by a predetermined angle are formed, is formed on the protection layer 246. The common electrode 226a is connected to a common electrode of an adjacent pixel unit through a common line CL or a connection pattern.

An alignment layer 248 aligned in the second direction by rubbing or optical alignment (for example, ultraviolet irradiation) is formed on the substrate 110.

Figure 5:
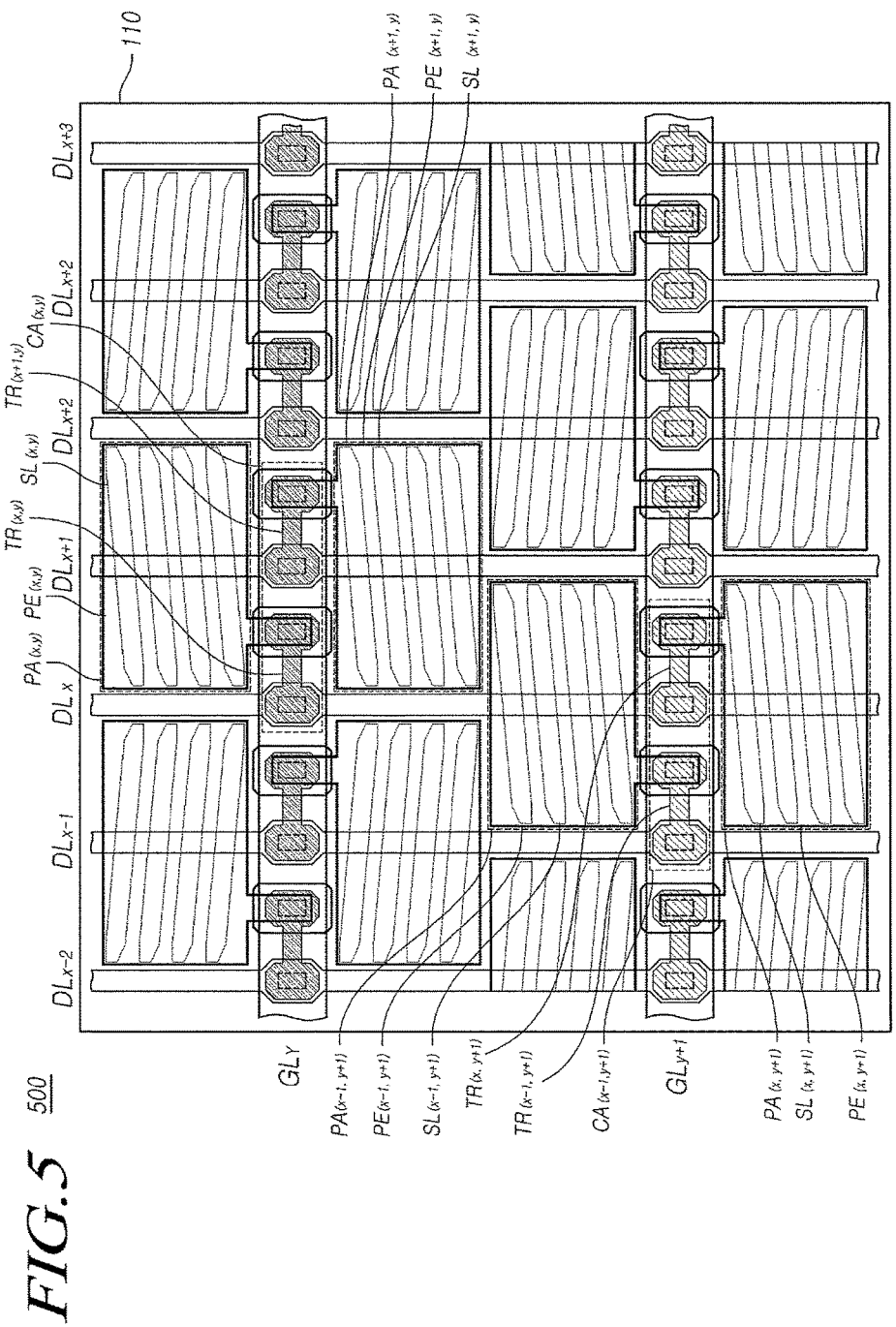
FIG. 5 is a plan view illustrating a part of a liquid crystal display device according to another embodiment of the present invention.

Next, in FIG. 5, a liquid crystal display device 500 according to another embodiment includes pixel units and circuit units formed in a yth gate line. The pixel units are the same as those of the liquid crystal display device 100 described with reference to FIG. 1.

Two pixel areas $PA_{(x, y)}$ and $PA_{(x+1, y)}$ are formed at an upper side and a lower side with respect to a plan surface of a $y^{th}$ gate line $GL_y$ between an $x^{th}$ data line DL and an $(x+2)^{th}$ data line intersecting the $y^{th}$ gate line $GL_y$, a circuit area $CA_{(x, y)}$ is formed between the two pixel areas $PA_{(x, y)}$ and $PA_{(x+1, y)}$. At this time, an $(x+1)^{th}$ data line $DL_{x+1}$ extends in the first direction across the pixel areas $PA_{(x, y)}$ and $PA_{(x+1, y)}$ and the circuit area $CA_{(x, y)}$.

A source electrode of one transistor $TR_{(x, y)}$ of the circuit area $CA_{(x, y)}$ of the upper side with respect to the plan surface of the $y^{th}$ gate line $GL_y$ is connected to the $x^{th}$ data line $DL_x$, and a drain electrode of the transistor $TR_{(x, y)}$ is connected to the pixel electrode $PE_{(x, y)}$ of the pixel area $PA_{(x, y)}$ of the upper side.

Further, a source electrode of another transistor $TR_{(x+1, y)}$ of the circuit area $CA_{(x+1, y)}$ of the lower side with respect to the plan surface of the yth gate line $GL_y$ is connected to the $(x+1)^{th}$ data line $DL_{x+1}$, and a drain electrode of the transistor $TR_{(x+1, y)}$ is connected to the pixel electrode $PE_{(x+1, y)}$ of the pixel area $PA_{(x+1, y)}$ of the lower side.

Meanwhile, a pixel unit and a circuit unit formed in a $(y+1)^{th}$ gate line $GL_{y+1}$ is shifted by one data line DL unit with respect to the pixel unit and the circuit unit formed in the $y^{th}$ gate line $GL_y$. In other words, the pixel unit and the circuit unit formed in a $(y+1)^{th}$ gate line $GL_{y+1}$ and the pixel unit and the circuit unit formed in the $y^{th}$ gate line $GL_y$ are shifted by one data line DL unit.

In detail, two pixel areas $PA_{(x-1, y+1)}$ and $PA_{(x, y+1)}$ are defined at an upper side and a lower side with respect to a plan surface of a $(y+1)^{th}$ gate line $GL_{y+1}$ between an $(x-1)^{th}$ data line $DL_{x-1}$ and an $(x+1)^{th}$ data line $DL_{x+1}$ intersecting the $(y+1)^{th}$ gate line $GL_{y+1}$, a circuit area $CA_{(x-1, y+1)}$ is defined between the two pixel areas $PA_{(x-1, y+1)}$ and $PA_{(x, y+1)}$. At this time, an xth data line DL extends in the first direction across the pixel areas $PA_{(x-1, y+1)}$ and $PA_{(x, y+1)}$ and the circuit area $CA_{(x-1, y+1)}$.

A source electrode of one transistor $TR_{(x-1, y+1)}$ of the circuit area $CA_{(x-1, y+1)}$ is connected to the $(x-1)^{th}$ data line $DL_{x-1}$, a drain electrode of the transistor $TR_{(x-1, y+1)}$ is connected to a pixel electrode $PE_{(x-1, y+1)}$ of the pixel area of the upper side.

Further, a source electrode of one transistor $TR_{(x, y+1)}$ of the circuit area $CA_{(x, y+1)}$ is connected to the $x^{th}$ data line $DL_x$, and a drain electrode of the transistor $TR_{(x, y+1)}$ is connected to the pixel electrode $PE_{(x, y+1)}$ of the pixel area $PA_{(x-1, y+1)}$ of the lower side.

As a result, the liquid crystal display device 500 has a pixel arrangement in which about half of the two pixel electrodes $PE_{(x, y)}$ and $PE_{(x+1, y)}$ formed at upper and lower sides of the $y^{th}$ gate line $GL_y$ merely overlap about half of the two pixel electrodes $PE_{(x-1, y+1)}$ and $PE_{(x, y+1)}$ formed at upper and lower sides of the $(y+1)^{th}$ gate line $GL_{y+1}$.

Next, in FIG. 6, a liquid crystal display device 600 according to yet another embodiment has the same pixel arrangement as that of the liquid crystal display device 500 described with reference to FIG. 5. Further, each pixel structure is substantially equal to the pixel structure described with reference to FIGS. 2 to 3.

However, in the liquid crystal display device 600 according to yet another embodiment, an auxiliary common electrode ACE is formed between a pixel area defined at an upper side of the $y^{th}$ gate line $GL_y$ and a pixel area defined at a lower side of the $(y-1)^{th}$ gate line $GL_{y-1}$.

Equally, an auxiliary common electrode ACE is formed evenly spaced between a pixel area defined at a lower side of the $y^{th}$ gate line $GL_y$ and a pixel area defined at an upper side of the $(y+1)^{th}$ gate line $GL_{y+1}$.

Totally, the auxiliary common electrodes ACEs are formed between the pixel areas defined at upper and lower sides of a specific gate line and the adjacent pixel areas of the adjacent gate lines. In the display device 600, although the auxiliary common electrodes ACEs may be formed between all gate lines, respectively, the auxiliary common electrodes ACEs may be regularly or irregularly formed between specific gate lines.

Figure 8:
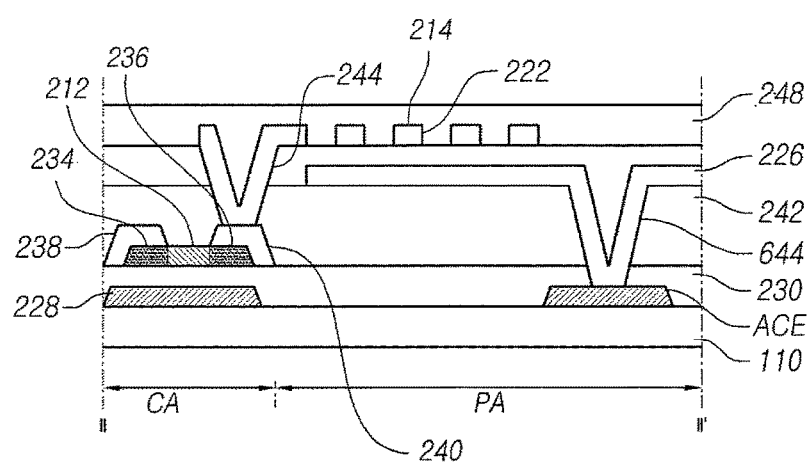
FIG. 8 is a sectional view illustrating an example taken along line II-II' of FIG. 7.

Next, in FIG. 8, a pixel structure includes the gate electrode 228 and the source/drain electrodes 238 and 240 formed on at least one of the gate insulation layer 230, the inter-layer insulation layer 242, and the protection layer 246. The pixel structure includes the transistor TR, the common electrode 226, and the semiconductor layer 215 (referring to FIG. 2). The pixel electrode 214 includes one or more slits 222 that are formed on the substrate 110 (referring to FIG. 1). The pixel structure as shown in FIG. 8 is substantially equal to the pixel structure described with reference to FIG. 3.

However, an auxiliary common electrode ACE is formed on the same layer on the substrate 110 (referring to FIG. 1) where the gate electrode 228 and the gate line GL (referring to FIG. 1) are formed. When the gate electrode 228 and the gate line GL are formed, the auxiliary common electrode ACE may be formed of the same material as that of the gate electrode 228 and the gate line GL to be substantially parallel to the gate line GL and to have a stripe shape.

Figure 6:
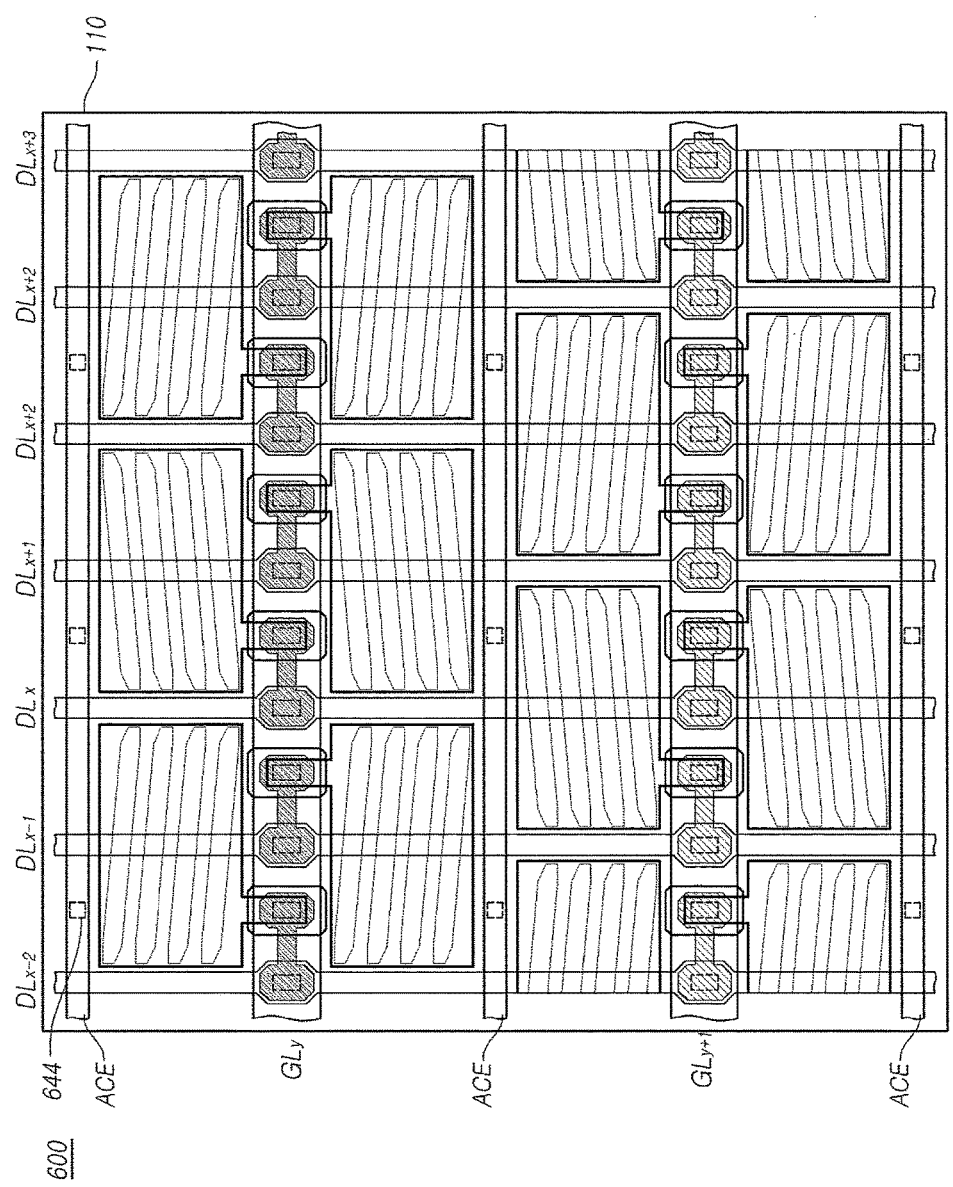
FIG. 6 is a plan view illustrating a part of a liquid crystal display device according to yet another embodiment of the present invention.
Figure 7:
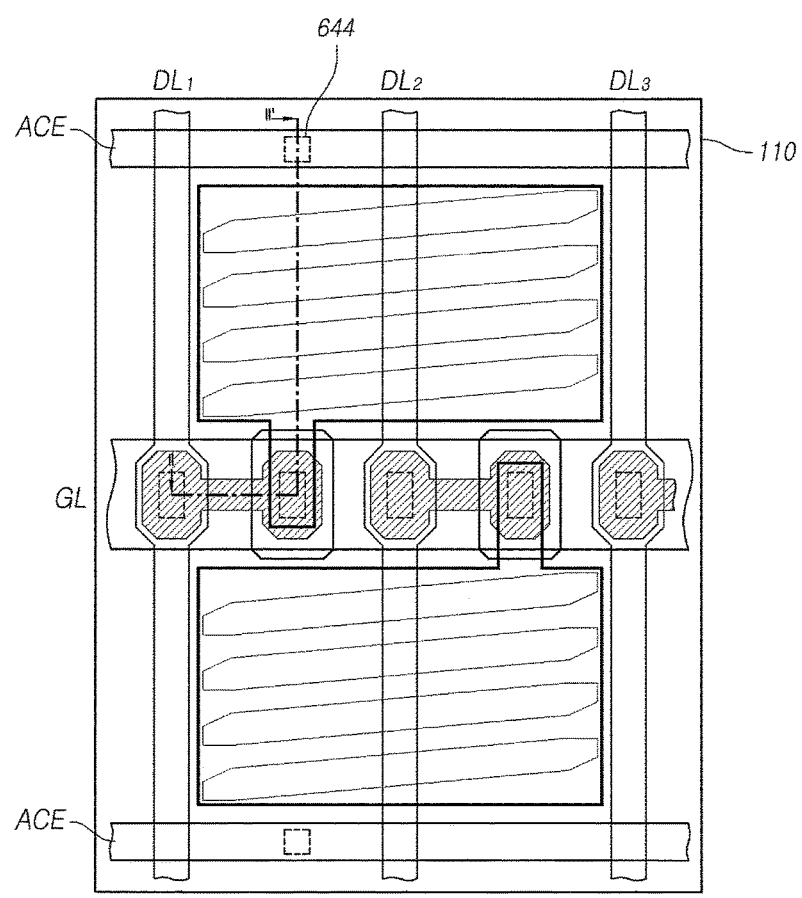
FIG. 7 is a partially enlarged view illustrating an area A of FIG. 6.

In addition, a contact hole 644 for the auxiliary common electrode ACE is formed on the gate insulation layer 230 and the inter-layer insulation layer 242 (referring to FIGS. 6 to 8). The common electrode 226 is connected to the auxiliary common electrode ACE through the contact hole 644 for the auxiliary common electrode ACE. The contact hole 644 for the auxiliary common electrode ACE may be formed in any location within the display device in which another conductive material is not formed between the common electrode 226 and the contact hole 644 for the auxiliary common electrode ACE.

The common electrode 226 may be a transparent conductive material and may have a surface electrode structure or a cylindrical electrode structure. Thus, an area of the common electrode 226 is wide so that a sheet resistance may be relatively high. When the liquid crystal display device has a large area and high resolution, the sheet resistance of the common electrode is relatively high, so that a greenish color may occur. When the common electrode 226, which is the surface electrode, is configured of a transparent conductive material to increase a transmittance ratio, the auxiliary common electrode ACE 644 conducted to the common electrode 226 and formed of a low resistive material is formed, so that the greenish color can be improved by decreasing the surface resistance.

Although it is described in the aforementioned embodiment that the auxiliary common electrode ACE is formed of the same material as that of the gate electrode 228 and the gate line GL to be substantially parallel to the gate line GL and have a stripe shape, the present invention is not limited thereto. The auxiliary common electrode ACE may be formed by a separate low resistance metal layer.

Although the pixel structure as shown in FIG. 8 is equal to the pixel structure described with reference to FIG. 3, the pixel structure as shown in FIG. 8 may be equal to the pixel structure described with reference to FIG. 4. In other words, the common electrode may be formed on the protection layer, so that the contact hole for connecting the common electrode and the auxiliary common electrode ACE to each other may be continuously formed in the protection layer, the inter-layer insulation layer, and the gate insulation layer. The common electrode and the auxiliary common electrode ACE may be connected to each other through the contact hole.

Figure 9:
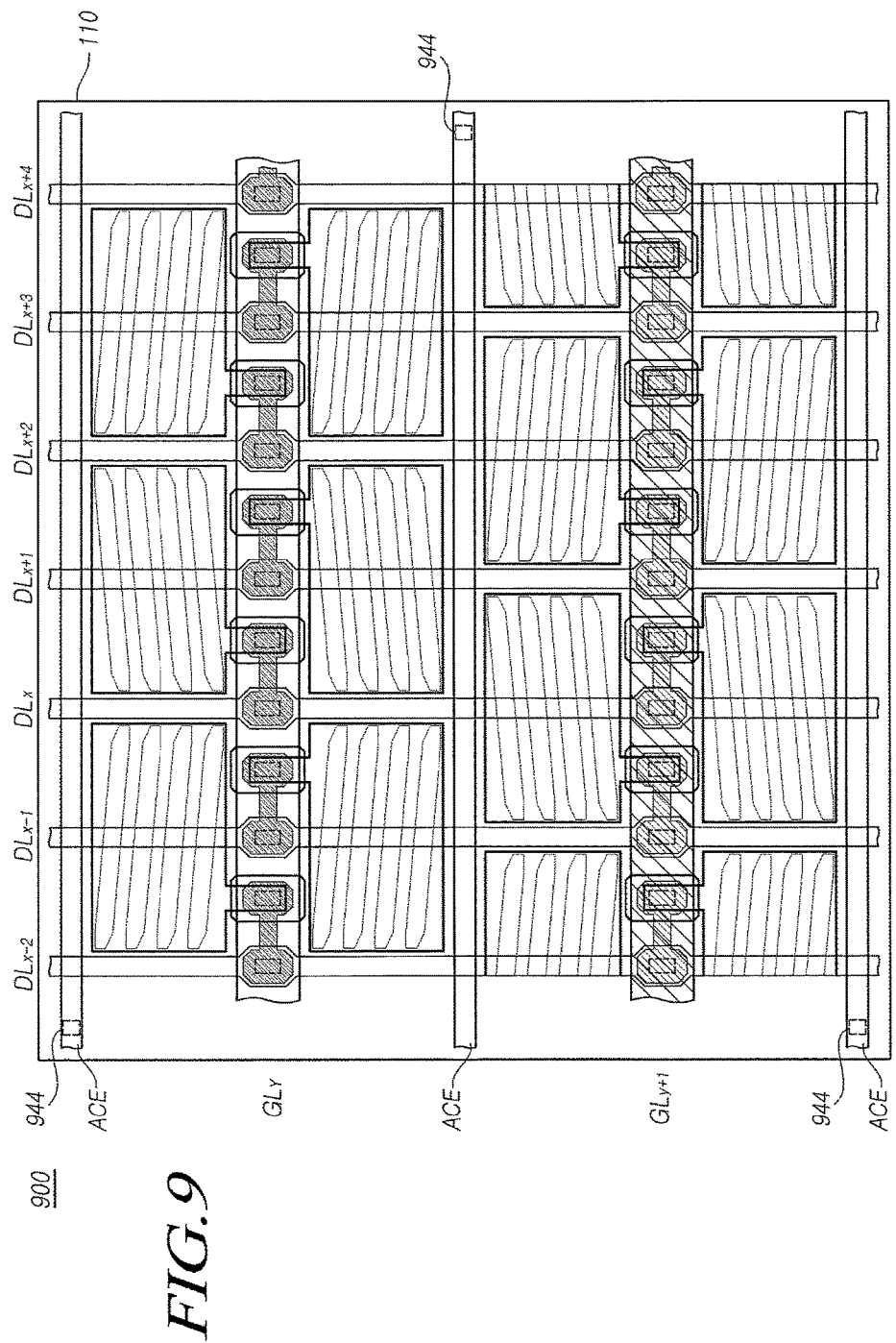
FIG. 9 is a plan view illustrating a part of a liquid crystal display device according to yet another embodiment of the present invention.

Next, in FIG. 9, a liquid crystal display device 900 according to yet another embodiment has the same pixel arrangement or the same pixel structure as that of the liquid crystal display device 600 described with reference to FIG. 6.

However, a contact hole 944 for an auxiliary common electrode ACE for connecting the common electrode 226 and the auxiliary common electrode ACE is formed on a non-active area other than an active area of the display device, and the common electrode 226 and the auxiliary common electrode ACE are connected to each other through the contact hole 944 for the auxiliary common electrode ACE. The auxiliary common electrodes ACEs formed between pixel areas of different gate lines GL parallel to the gate line GL may be connected to the common electrodes 226 through the contact hole 944 for the auxiliary common electrode ACE, respectively.

As illustrated in FIG. 6, the contact hole 944 for the auxiliary common electrode ACE for connecting the common electrode 266 and the auxiliary common electrode ACE is formed within the active area of the display panel. As illustrated in FIG. 9, the contact hole 944 for the auxiliary common electrode ACE may be also formed on the non-active area of the display panel. In this case, as illustrated in FIG. 6, the number of the contact holes 644 for the auxiliary common electrode ACE for connecting the common electrode 226 and the auxiliary common electrode ACE may be relatively decreased, and the contact hole 944 for the auxiliary common electrode ACE may be formed on areas other than the active area of the display panel.

Further, although it has been described that the pixel arrangements of the liquid crystal display devices 600 and 900 described with reference to FIGS. 6 to 9 are equal to the pixel arrangement of the liquid crystal display device 500 described with reference to FIG. 5, the pixel arrangements of the liquid crystal display devices 600 and 900 may be equal to the pixel arrangement of the liquid crystal display device 100 described with reference to FIG. 1.

In the liquid crystal display devices 600 and 900 described with reference to FIGS. 6 to 9, respectively, when the gate electrode and the gate line are formed on the same layer on the substrate in which the gate electrode and the gate line are formed, the auxiliary common electrodes ACE are formed of the same material as that of the gate electrode 228 and the gate line GL to be substantially parallel to the gate line GL and to have a stripe shape. However, the present invention is not limited thereto.

The terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. A term ordinarily used like that defined by a dictionary shall be construed that it has a meaning equal to that in the context of a related description, and shall not be construed in an ideal or excessively formal meaning unless it is clearly defined in the present specification.

Although the embodiments of the present invention have been described for illustrative purposes, those skilled in the art will appreciate that various modifications, additions and substitutions are possible, without departing from the scope and spirit of the invention. Therefore, the exemplary embodiments of the present invention disclosed herein are intended to illustrate the scope of the technical idea of the present invention, and the scope of the present invention is not limited by the exemplary embodiments. The scope of the present invention shall be construed on the basis of the accompanying claims in such a manner that all of the technical ideas included within the scope equivalent to the claims belong to the present invention.

What is claimed is:
1. A liquid crystal display device, comprising:
first, second, and third data lines extending in a first direction on a substrate, the second data line positioned between the first and third data lines;
a plurality of gate lines extending in a second direction on the substrate;
at least one pixel unit including a first pixel electrode formed in a first pixel area between the first and third data lines intersecting the gate lines, at one side of a first gate line, and a second pixel electrode formed in a second pixel area between the first and third data lines, at another side of the first gate line; and
at least one circuit unit formed between the first pixel area and the second pixel area and including a first transistor in which a first electrode of the first transistor is connected to the first data line and a second electrode of the first transistor is connected to the first pixel electrode, and a second transistor in which a third electrode of the second transistor is connected to the second data line and a fourth electrode of the second transistor is connected to the second pixel electrode,
wherein the second data line bisects the first and second pixel electrodes, and the first and second pixel electrodes are defined across the second data line,
wherein each of the first and second pixel electrodes has a plurality of slits, and
wherein the plurality of slits in each of the first and second pixel electrodes are oriented in a direction of the gate lines, not in a direction of the data lines so that the plurality of slits intersect the second data line.

2. The liquid crystal display device of claim 1, further comprising:
fourth and fifth data lines,
wherein the at least one pixel unit includes a third pixel electrode formed in a third pixel area between the third and fifth data lines intersecting the gate lines, at the one side of the first gate line, and a fourth pixel electrode formed in a fourth pixel area between the third and fifth data lines, at the another side of the first gate line, and
wherein the plurality of slits in the first pixel electrode are in a first diagonal direction for a first domain and the third pixel electrode includes slits in a second diagonal direction for a second domain.

3. The liquid crystal display device of claim 2, wherein the fourth data line is between the third and fifth data lines,
wherein the slits in the first pixel electrode are symmetrical to the slits in the third pixel electrode, and
wherein angles of all of the slits in the first pixel electrode are positive and angles of all of the slits in the third pixel electrode are negative.

4. The liquid crystal display device of claim 2, wherein the slits in the first and third pixel electrodes are in third and fourth directions, respectively, in the substrate,
wherein the first and second directions are vertical and horizontal, respectively, and the third and fourth directions are diagonal, and
wherein the slits in the first pixel electrode are symmetrical to the slits in the third pixel electrode.

5. The liquid crystal display device of claim 1, further comprising:
a gate electrode formed on the substrate;
a gate insulation layer formed on the gate electrode, wherein the second electrode is formed on the gate insulation layer;
source and drain areas formed on the gate insulation layer on opposite sides of the second electrode; and
source and drain electrodes formed on the source and drain areas, respectively.

6. The liquid crystal display device of claim 5, further comprising:
an inter-layer insulation layer formed on the source and drain electrodes, the second electrode, and the gate insulation layer;
a common electrode formed on the inter-layer insulation layer;
a protection layer formed on the inter-layer insulation layer; and
a contact hole formed through the inter-layer insulation layer and the protection layer,
wherein the first pixel electrode and the second pixel electrode are formed diagonally to the data lines and the gate lines, and
wherein the first electrode and the second electrode are connected to a semiconductor layer.

7. The liquid crystal display device of claim 6, wherein the fourth data line overlaps the third pixel area and is between the third and fifth data lines, and
wherein the slits in the first pixel electrode are symmetrical to the slits in the third pixel electrode.

8. A liquid crystal display device, comprising:
first, second, and third data lines extending in a first direction on a substrate;
a plurality of gate lines extending in a second direction on the substrate;
at least one pixel unit including a first pixel electrode formed in a first pixel area between the first and third data lines intersecting the gate lines, at one side of a first gate line, and a second pixel electrode formed in a second pixel area between the first and third data lines, at another side of the first gate line; and
at least one circuit unit formed between the first pixel area and the second pixel area and including a first transistor in which a first electrode of the first transistor is connected to the first data line and a second electrode of the first transistor is connected to the first pixel electrode, and a second transistor in which a third electrode of the second transistor is connected to the second data line and a fourth electrode of the second transistor is connected to the second pixel electrode,
wherein the second data line bisects the first and second pixel electrodes, and the first and second pixel electrodes are defined across the second data line,
wherein each of the first and second pixel electrodes has a plurality of slits, and
wherein the plurality of slits in each of the first and second pixel electrodes are oriented in a direction of the gate lines, not in a direction of the data lines so that the plurality of slits intersect the second data line.

9. The liquid crystal display device of claim 8, further comprising:
fourth and fifth data lines,
wherein the at least one pixel unit includes a third pixel electrode formed in a third pixel area between the third and fifth data lines intersecting the gate lines, at the one side of the first gate line, and a fourth pixel electrode formed in a fourth pixel area between the third and fifth data lines, at the another side of the first gate line,
wherein the plurality of slits in the first pixel electrode are in a first diagonal direction for a first domain and the third pixel electrode includes slits in a second diagonal direction for a second domain, and
wherein the fourth data line is positioned between the third and fifth data lines to intersect the third pixel area.

10. The liquid crystal display device of claim 9, wherein the fourth data line is between the third and fifth data lines,
wherein the slits in the first pixel electrode are symmetrical to the slits in the third pixel electrode, and
wherein angles of all of the slits in the first pixel electrode are positive and angles of all of the slits in the third pixel electrode are negative.

11. The liquid crystal display device of claim 9, wherein the slits in the first and third pixel electrodes are in third and fourth directions, respectively, in the substrate,
wherein the first and second directions are vertical and horizontal, respectively, and the third and fourth directions are diagonal, and
wherein the slits in the first pixel electrode are symmetrical to the slits in the third pixel electrode.

12. The liquid crystal display device of claim 8, further comprising:
a gate electrode formed on the substrate;
a gate insulation layer formed on the gate electrode, wherein the second electrode is formed on the gate insulation layer;
source and drain areas formed on the gate insulation layer on opposite sides of the second electrode; and
source and drain electrodes formed on the source and drain areas, respectively.

13. The liquid crystal display device of claim 12, further comprising:
an inter-layer insulation layer formed on the source and drain electrodes, second electrode, and gate insulation layer;

a common electrode formed on the inter-layer insulation layer;

a protection layer formed on the inter-layer insulation layer; and a contact hole formed through the inter-layer insulation layer and protection layer, wherein the first pixel electrode and the second pixel electrode are formed diagonally to the data lines and the gate lines, and wherein the first electrode and the second electrode are connected to a semiconductor layer.

14. A liquid crystal display device, comprising:

first, second, and third data lines on a substrate, the second data line located between the first and third data lines;

a plurality of gate lines on the substrate;

a first pixel electrode in a first pixel area between the first and third data lines intersecting the gate lines, at one side of a first gate line, and a second pixel electrode in a second pixel area between the first and third data lines, at another side of the first gate line;

a first transistor connected to the first data line and the first pixel electrode; and a second transistor connected to the second data line and the second pixel electrode, wherein the second data line bisects the first and second pixel electrodes, and the first and second pixel electrodes are defined across the second data line, wherein each of the first and second pixel areas has a plurality of slits, and wherein the plurality of slits in each of the first and second pixel areas are oriented in a direction of the gate lines, not in a direction of the data lines so that the plurality of slits intersect the second data line.

15. The liquid crystal display device of claim 14, wherein the first and second transistors are located between the first and second pixel areas.

16. The liquid crystal display device of claim 14, wherein the first and second transistors are on the first gate line.

17. The liquid crystal display device of claim 14, wherein the slits in the first pixel area are aligned with the slits in the second pixel area.

18. A liquid crystal display (LCD) device comprising:

a substrate having a matrix of conductive lines comprised of data lines and gate lines that extend perpendicular to and intersect with the data lines; and a pixel structure on the substrate at or near regions where the data lines and gate lines intersect, the pixel structure comprising an array of pixel units in a row direction and a column direction, each pixel unit defined between two data lines with a gate line spanning across the two data lines in a bisecting manner with respect to the pixel unit to define a first pixel area and a second pixel area, the first pixel area having a first pixel electrode and the second pixel area having a second pixel electrode, each of the first and second pixel electrodes having a plurality of slits oriented to be bisected by one of the data lines.

19. The LCD device of claim 18, wherein the first and second pixel electrodes respectively have a length in the direction of the gate lines that is greater than a length in the direction of the data lines.

20. The LCD device of claim 19, wherein the pixel structure further comprises a circuit area between the first and second pixel areas, and the circuit area has a width that is less than a width of the gate line.

21. The LCD device of claim 20, wherein the circuit area is a particular circuit area including at least one thin film transistor (TFT) having oxide material as an active layer of the of the pixel structure, and the first and second pixel areas between which the particular circuit area is formed have an aperture ratio.

22. The LCD device of claim 21, wherein the first pixel area is related to a first color and the second pixel area is related to a second color that is different from the first color.

23. The LCD device of claim 22, wherein the pixel units are aligned in both the row direction and the column direction.

24. The LCD device of claim 22, wherein the pixel units have a staggered arrangement with respect to either the row direction or the column direction.

25. The LCD device of claim 18, wherein the one of the data lines that bisects the plurality of slits also bisects both the first pixel electrode and the second pixel electrode.

\* \* \* \* \*